United States Patent Office 3,293,253
Patented Dec. 20, 1966

3,293,253
N,N'-BIS-(LOWERALKYLSULFONYLOXY-PROPIONYL) PIPERAZINES
Bruce W. Horrom, Waukegan, and John A. Carbon, Lake Bluff, Ill., assignors to Abbott Laboratories, North Chicago, Ill., a corporation of Illinois
No Drawing. Filed Nov. 12, 1964, Ser. No. 410,756
2 Claims. (Cl. 260—268)

This application is a continuation-in-part of our copending application U.S. Serial No. 372,396, filed June 3, 1964, which in turn was a continuation-in-part of U.S. Serial No. 41,797, filed July 11, 1960, both of which have been abandoned.

This invention is concerned with the production of new and novel compounds corresponding to the formula

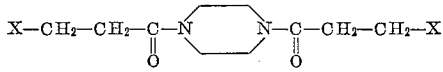

wherein each X represents a loweralkylsulfonyloxy radical containing from 1 to 4 carbon atoms, inclusive. These compounds are white, crystalline solids soluble in most organic solvents but substantially insoluble in water. They have been found to be useful as aquatic herbicides. When N,N' - bis-(3-methanesulfonyloxypropionyl)piperazine is employed as an aquatic herbicide at a concentration of 100 parts or more per million of water, good control of the growth of duckweed and salvinia is obtained.

The new compounds can be conveniently prepared by the reaction of one molecular proportion of an N,N'-bis-(3-halopropionyl)piperazine with at least two molecular proportions of the silver salt of a loweralkyl sulfonate. In carrying out the reaction, a mixture of the reactants in acetonitrile is refluxed for a period of time to complete the reaction. The silver halide of reaction is thereafter removed by filtration and the filtrate evaporated to dryness. The residue is extracted with a suitable organic solvent such as chloroform and the extracts evaporated to dryness. Upon recrystallization of the dry residue from a suitable, organic solvent such as an alcohol-water mixture, the desired product is obtained as a white, crystalline solid.

The following example is presented to illustrate rather than limit the invention.

EXAMPLE I

N,N'-bis-(3-methanesulfonyloxypropionyl)piperazine

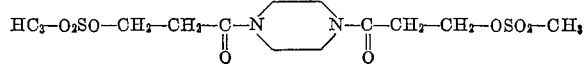

To a solution of 17.2 grams (0.10 mole) of 3-bromopropionyl chloride in 100 ml. of anhydrous benzene was added dropwise with stirring a solution of 8.6 grams (0.10 mole) of anhydrous piperazine in 20 ml. of dry chloroform over a period of 30 minutes. The temperature rose spontaneously to 45° C. during the addition. After the temperature ceased to rise, stirring was continued for another hour. The reaction mixture was then filtered to remove the piperazine hydrochloride by-product. The filtrate was evaporated to dryness and the residue recrystallized from ethanol to obtain the intermediate N,N'-bis-(3-bromopropionyl)piperazine as a white crystalline solid melting at 103°–104° C.

A mixture of 10 grams (0.028 mole) of N,N'-bis-(3-bromopropionyl)piperazine thus prepared and 16.4 grams (0.081 mole) of silver methanesulfonate in 75 ml. of dry acetonitrile was refluxed for 22.5 hours to complete the reaction. The silver bromide by-product was removed by filtration and the filtrate evaporated to dryness. The residue was repeatedly extracted with hot chloroform, the extracts evaporated and the resulting residue recrystallized from ethanol-water to obtain the desired product as a white, crystalline solid melting at 175°–177° C. Upon analysis, the product was found to contain 7.30% nitrogen which corresponded closely to the calculated value of 7.25% nitrogen.

In a manner similar to that described in Example I, N,N'-bis-(3-bromopropionyl)piperazine can be reacted with the silver salt of ethanesulfonic acid, propanesulfonic acid or butanesulfonic acid to obtain the corresponding N,N' - bis - (3-ethanesulfonyloxypropionyl) piperazine, N,N' - bis - (3-propanesulfonylpropionyl)piperazine or N,N'-bis-(3 - butanesulfonyloxypropionyl)piperazine, respectively.

What we claim is:
1. A bis compound corresponding to the formula

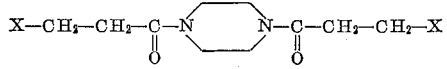

wherein each X is loweralkylsulfonyloxy.
2. N,N' - bis-(3-methanesulfonyloxypropionyl)piperazine.

No references cited.

ALEX MAZEL, Primary Examiner.

HENRY R. JILES, Examiner.

JAMES W. ADAMS, JR., Assistant Examiner.